United States Patent [19]

Gründl et al.

[11] Patent Number: 5,381,330
[45] Date of Patent: Jan. 10, 1995

[54] HALF-BRIDGE ARRANGEMENT FOR SWITCHING ELECTRICAL POWER

[75] Inventors: Andreas Gründl, Munich; Bernhard Hoffmann, Starnberg, both of Germany

[73] Assignee: Grundl & Hoffmann, Germany

[21] Appl. No.: 118,035

[22] Filed: Sep. 8, 1993

[51] Int. Cl.$^6$ .................................... H02M 7/5387
[52] U.S. Cl. ................................ 363/132; 363/141
[58] Field of Search ............ 363/17, 98, 132, 136, 363/141, 144, 146; 361/271, 279, 281, 326

[56] References Cited

U.S. PATENT DOCUMENTS

| | | | |
|---|---|---|---|
| 4,617,621 | 10/1986 | Kuroki | 363/71 |
| 4,860,184 | 8/1989 | Tabisz et al. | 363/132 |
| 4,979,089 | 12/1990 | Takase | 363/132 |
| 5,132,896 | 7/1992 | Nishizawa et al. | 363/144 |
| 5,170,337 | 12/1992 | Borowiec et al. | 363/132 |
| 5,231,563 | 7/1993 | Jitaru | 363/98 |
| 5,253,157 | 10/1993 | Severinsky | 363/132 |

FOREIGN PATENT DOCUMENTS

4027969C1  7/1991  Germany ................. H02M 7/48

*Primary Examiner*—Steven L. Stephan
*Assistant Examiner*—Matthew Nguyen
*Attorney, Agent, or Firm*—Haverstock, Medlen & Carroll

[57] ABSTRACT

A half-bridge arrangement for switching electrical powers, wherein at least two semiconductor switches (14, 21; 15, 20; 16, 19; 17, 18) forming a half-bridge (12a; 12b; 12c; 12d) are connected in series; each semiconductor switch (14, 21; 15, 20; 16, 19; 17, 18) is provided with a control input (G) which is connected to a driving circuit (23, 24); each first semiconductor switch (14; 15; 16; 17) is at a high voltage potential ($V_{SS}$) with its source terminal (S); each second semiconductor switch (18; 19; 20; 21) is at a low voltage potential ($V_{DD}$) with its drain terminal (D); the drain terminal (D) of each first semiconductor switch (14; 5; 16; 17) is connected with the source terminal (S) of each respective second semiconductor switch (18; 19; 20; 21) for providing an output terminal (A); and at least one capacitor assembly (30) is arranged between the high and the low voltage potential ($V_{SS}$, $V_{DD}$); is characterized in that said driving circuit (23, 24) activates said semiconductor switches (14, 21; 15, 20; 16, 19; 17, 18) by a control signal with a switching frequency of more than 20 kHz; said capacitor assembly (30) is made up by at least one sheet capacitor (30a) at a printed circuit board (33) carrying semiconductor switches (14, 21; 15, 20; 16, 19; 17, 18) and by at least one wrap capacitor (30b) designed as a hollow coil (40); said semiconductor switches (14, 21; 15, 20; 16, 19; 17, 18) being arranged within said wrap capacitor (30b); and a fluid cooling being provided within the hollow coil (40).

15 Claims, 3 Drawing Sheets

HALF-BRIDGE ARRANGEMENT FOR SWITCHING ELECTRICAL POWER

FIELD OF THE INVENTION

The present invention relates to a half-bridge arrangement for switching electrical power, wherein at least two semiconductor switches forming a half-bridge are connected in series; each semiconductor switch is provided with a control input which is connected to a driving means; each first semiconductor switch is at a high voltage potential with its source terminal; each second semiconductor switch is at a low voltage potential with its drain terminal; the drain terminal of each first semiconductor switch is connected with the source terminal of each respective second semiconductor switch for providing an output terminal; an at least one capacitor assembly is arranged between the high and the low voltage potential.

BACKGROUND OF THE INVENTION

Such half-bridge arrangements are disclosed in DE-4 027 069 C1 and have been employed in the construction of inverters for the most different applications, e.g. for the supply of rotating-field motors, permanent magnet motors and the like.

In this context, there is, however, the problem that the power density, i.e. the output power in relation to the volume of the arrangement is relatively poor in conventional arrangements. In addition, the weight of conventional arrangements is relatively high.

From U.S. Pat. No. 5,132,896 an inverter arrangement is known, which in order to reduce the effect of distributed inductances of the conductors used to connect the capacitors and the semiconductor switches employs plate-shaped supply lines of large area. This eliminates the need for large snubber capacitors to compensate for the line inductances. Moreover, the large area configuration of the plate-shaped supply lines can improve heat dissipation. Moreover, the plate-shaped supply lines are designed such that magnitude and direction of the current flow through the plate-shaped supply lines minimize the effect of the distributed inductances.

In the case of this inverter arrangement, however, the large area supply lines only serve the purpose of reducing interference inductances and are employed as supply lines to large electrolytic capacitors.

BRIEF DESCRIPTION OF THE INVENTION

In order to overcome these drawbacks, the above described half-bridge arrangement is characterized in that said driving means activates said semiconductor switches by means of a control signal with a switching frequency of more than 20 kHz; said capacitor assembly is made up by at least one sheet capacitor at a printed circuit board carrying semiconductor switches and/or by at least one wrap capacitor designed as hollow coil; said semiconductor switches being arranged within said wrap capacitor designed as hollow coil; and a fluid cooling being provided within the hollow coil.

Due to the high switching frequency it is possible to manage with lower capacitances in the capacitor assembly than it is the case with conventional half-bridges. In the arrangement according to the invention the capacitor assembly takes up approx. 3% of that volume which is required in conventional half-bridge arrangements. In view of the fact that the capacitors of conventional half-bridge arrangements take up approx. 40% of the total volume, this represents a significant volume reduction. Moreover, the capacitors of conventional half-bridge arrangements are formed as electrolytic capacitors, which on the one hand leads to a reduction of life and on the other hand to the impossibility of any application under ex conditions.

In addition, the high switching frequency—the switching frequency preferably amounts to 100 kHz—allows for a more precise selection of the curve shape of the current drain so that the filter expenditure can be reduced.

Since with the high switching frequencies involved it is sufficient to form the supply lines in the printed circuit boards and within the shroud as capacitance-carrying components in order to obtain the required capacitance values for the smoothing capacitors, the required capacitances can be positioned very close to the semiconductor switches, so that an optimum construction is ensured.

In addition, the problems related to overvoltages during the switching process are virtually eliminated due to the compact construction in the hollow coil being part of the capacitor assembly or on the printed circuit board, respectively. It is thus possible to operate the components to the limit of their electric strength.

By forming the shroud as part of the capacitor assembly surrounding the switching components, both the radiation of stray fields is minimized as well as the irradiation interference immunity is maximized.

The reduced volume allows the use of a great number of small-sized semiconductor switches so that cooling of the individual semiconductor switches is easier to achieve than in the case of a few large-sized components.

Moreover, the use of numerous small components permits asynchronous switching which enables better utilization of the available capacitances.

Due to the high switching frequencies the line related interferences can be filtered out more easily so that the interference protection measures are less extensive than those of state of the art arrangements.

Because the compact construction requires a high power density and corresponding measures for cooling, the selected fluid cooling though necessary on the one hand, permits on the other hand the hermetic or fluid tight, respectively, sealing of the arrangement, which is in accordance with even the most stringent safety requirements. In this context it is to be noted that a small volume lends itself more readily to encapsulation than a large volume, as is the case with arrangements to the state of the art.

In a preferred embodiment the semiconductor switches are formed by rapid, low loss field-effect transistors (FET's) or by rapid, low-loss bipolar transistors with insulated gate terminal (IGBT's). In particular, MOS-FET's with integrated freewheeling diodes or with (additional) external freewheeling diodes can be employed.

Firstly, these components are readily connectable in parallel in order to achieve the desired power handling capacity with respect to the effective current and secondly, the actuating power is low so that the driving electronics does not require extensive final stages.

By using numerous semiconductor switching elements each with a small switching capacity, but which are easily connectable in parallel, a satisfactory cooling can be achieved because the numerous individual components are easily accessible for the cooling medium.

In order to enable a simply cascadable modular construction and for a particularly compact design it is advantageous to also arrange the driving means in the interior of the hollow coil.

In order to obtain a lowest possible inductance and capacitive supply line and wiring configuration and in order to accommodate a highest possible capacitance in the printed circuit board assembly, the printed circuit board of a preferred embodiment is formed as a multi-layer board, where at least a first conductive layer carries the high voltage potential; a second conductive layer carries the low voltage potential; and an insulating layer is arranged between the first and the second conductive layer.

Thus, virtually the entire current supply represents a capacitor, where by suitable selection with respect to electric strength and dielectric constant the characteristics of the capacitance for a predetermined area of the printed circuit board can be established.

In order to achieve a high capacitance, if required, of the capacitor assembly acting as smoothing capacitor, the hollow coil is additionally formed to comprise multiple layers, where at least one first conductive layer carries the high voltage potential; at least a second conductive layer carries the low voltage potential; and an insulating layer is arranged between the first and the second conductive layer. With respect to the capacitance, the same applies here as for the printed circuit board. By simply wrapping the individual layers several times, however, the capacitance can be increased almost at will.

In order to adequately decouple the assemblies on the individual printed circuit boards from one another in half-bridge arrangements for polyphase operation or in several parallel connected arrangements, it is preferable that the hollow coil includes several assemblies comprising first and second layers as well as insulating layers, with the individual assemblies extending at the inner side of the hollow coil in a circumferential direction in an offset manner so that areas of the individual first and second conductive layers as well as insulated connector strips are exposed.

Thus, individual identically structured printed circuit boards can be inserted into the hollow coil in a stacked manner and contact the respective insulated conductor strips at the inside of the hollow coil through terminal points at the printed circuit boards, being slighty rotated relative to each other. In order to avoid voltage breakdowns between the individual capacitor assemblies and also to better decouple the individual capacitors from one another, the individual assemblies comprising the first and second layers as well as the insulating layer are preferably sandwiched in such a manner that each of the first or second conductive layer, respectively, of an assembly is arranged adjacent to the first or second conductive layer, respectively, of another assembly and a thin insulating layer is arranged between the individual assemblies. Thus no potential difference exists between the individual assemblies so that the insulating layer has to meet only moderate requirements.

Preferably the first conductive layer is a copper layer with a thickness of at least 35 $\mu$m 70 $\mu$m; the second conductive layer is a copper layer with a thickness of at least 35 $\mu$m–70 $\mu$m; and the insulating layer is a plastic layer with a thickness of at least 10–20 $\mu$m made from Kapton. Depending on the required capacitance and electric strength, other dimensions and materials, however, are also possible.

In order to accomplish half-bridge arrangements or other circuit arrangements or to provide half-bridge arrangements with a particularly high switching capacity, it is advantageous to arrange several printed circuit boards with half-bridges in an axially spaced relationship in the interior of the hollow coil, on which terminals of the individual printed circuit boards for the high and the low voltage potential or for the respective capacitor assembly of the control terminals and output terminals are so arranged at the circumference of the individual printed circuit boards that they make contact with the exposed areas of the individual first and second conductive layers or insulated conductor strips, respectively.

This construction allows for a modularization of the individual printed circuit boards, and solely the connection outside the hollow coil determines the switching capacity or the circuit arrangement as a whole.

In order to comply with the safety requirements which e.g. are valid in mining operations or in other dangerous areas, it is advantageous to provide a shroud for the hollow coil so that the entire arrangement is is made resistant to pressure of up to approximately 15 bar. Thus a damage occurring inside the hollow coil cannot propagate to the outside.

This holds true particularly if the fluid cooling is designed as boiling bath cooling with a fluid fluorocarbon, with the pressure inside the hollow coil ranging from 50 mbar and 3 bar and the temperature difference between the semiconductor switches and the atmosphere surrounding the hollow coil amonting to approx. 10° C. In this context, the fluid fluorocarbon surrounding the semiconductor switches also acts as seal for the semiconductors against the environment with the consequence that conventional components which are merely plastic-sheathed have a life comparable to that of hermetically sealed MIL components.

Although fluorocarbons as cooling agents are relatively environmentally compatible, they have been hardly used yet due to their high price. Because the compact arrangement according to the invention requires only small quantities, the price of the fluorocarbon is no longer of decisive importance.

Because of the pressure resistant sealing of the hollow coil the boiling cooling can be effected along the vapour pressure curve of the fluorocarbon. As a result, already slight temperature increases at the semiconductor switches cause the initialization of the cooling.

To maintain the semiconductor switches at a lowest possible temperature, the boiling bath cooling is equipped with a down-cooling heat exchanger, which via convection cooling means arranged at the outer surface of the hollow coil removes dissipated heat from the interior of the hollow coil.

BRIEF DESCRIPTION OF THE DRAWINGS

In the drawings a preferred embodiment of the invention is illustrated, in which.

DETAILED DESCRIPTION OF A PREFERRED EMBODIMENT

Figure 1:
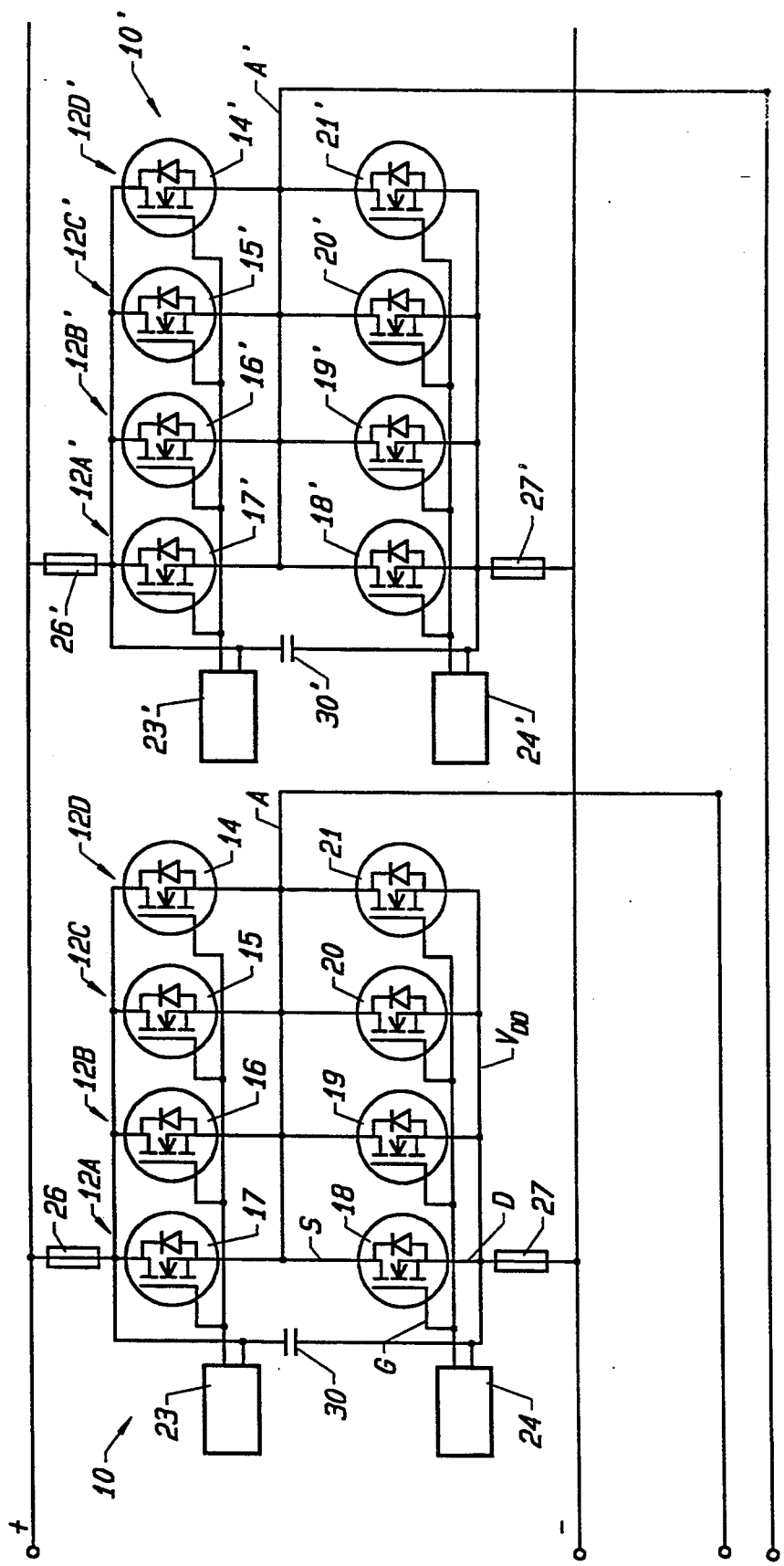
FIG. 1 shows an electrical circuit diagram of a single-phase inverter with two half-bridge arrangements.

FIG. 1 as an application example of the half-bridge arrangement according to the invention shows a single-phase inverter with two half-bridge arrangements 10, 10' of identical structure. Therefore, only one of both half-bridge arrangements will be described in detail in the following, while the other half-bridge arrangement is identified by the same reference numerals together with an apostrophe.

Half-bridge arrangement 10 features four pairs 12a, 12b, 12c, 12d of n-channel MOSFET's connected in parallel which act as semiconductor switches. Two each of n-channel MOSFET's 14, 21; 15, 20; 16, 19; 17, 18, forming a pair each, are connected in series so that each of first n-channel MOSFET 14; 15; 16; 17 of each pair with its source terminal is at a high voltage potential $V_{SS}$ and each second n-channel MOSFET 21; 20; 19; 18 of each pair with its drain terminal is at a low voltage potential $V_{DD}$. For the purpose of building an output terminal A the drain terminal of each of first n-channel MOSFET's 14; 15; 16; 17 is connected with the source terminal of each of the second n-channel MOSFET's 21; 20; 19; 18. One driving means 23, 24 each for the group of first n-channel MOSFET's 14; 15; 16; 17 or the group of second n-channel MOSFET's 21; 20; 19; 18 is connected with the control inputs connected in parallel of each group of first and second n-channel MOSFET's. The supply lines for the high and the low voltage potential ($V_{SS}$ and $V_{DD}$) to the source or drain terminals, respectively, of the n-channel MOSFET's are individually protected by a fuse 26, 27.

Between the high and the low voltage potential $V_{SS}$ and $V_{DD}$ a capacitor 30 is arranged which functions as a smoothing capacitor. The actual design of capacitor 30 is decribed later. Each driving means 23, 24 actuates the respective group of n-channel MOSFET's by means of a control signal with a switching frequency of more than 20 kHz. Preferably, the switching frequency amounts to up to 100 kHz.

Figure 2A:
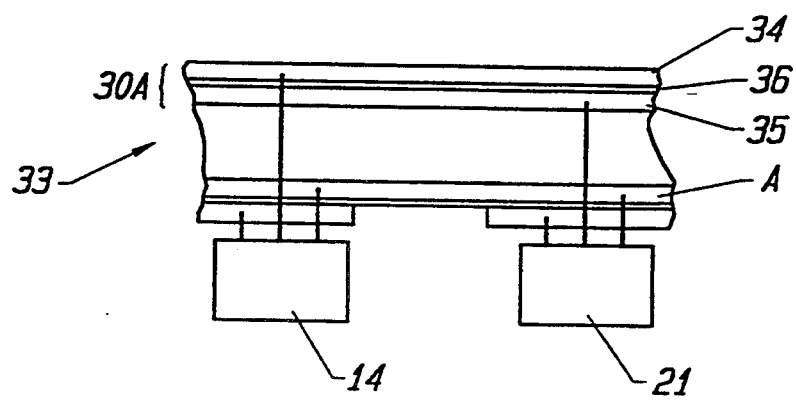
FIG. 2a shows a printed circuit board carrying the half-bridge arrangements as a partly schematic cross-sectional representation.

As illustrated in FIG. 2a capacitor assembly 30 is made up by at least one sheet capacitor 30a at a printed circuit board 33 carrying the MOSFET's. Two 70 μm thick copper layers 34, 35 are separated from each other by a 10 μm–20 μm thick insulating layer made from Kapton. Copper layers 34, 35 are on the high or low voltage potential $V_{SS}$ and $V_{DD}$.

Figure 2B:
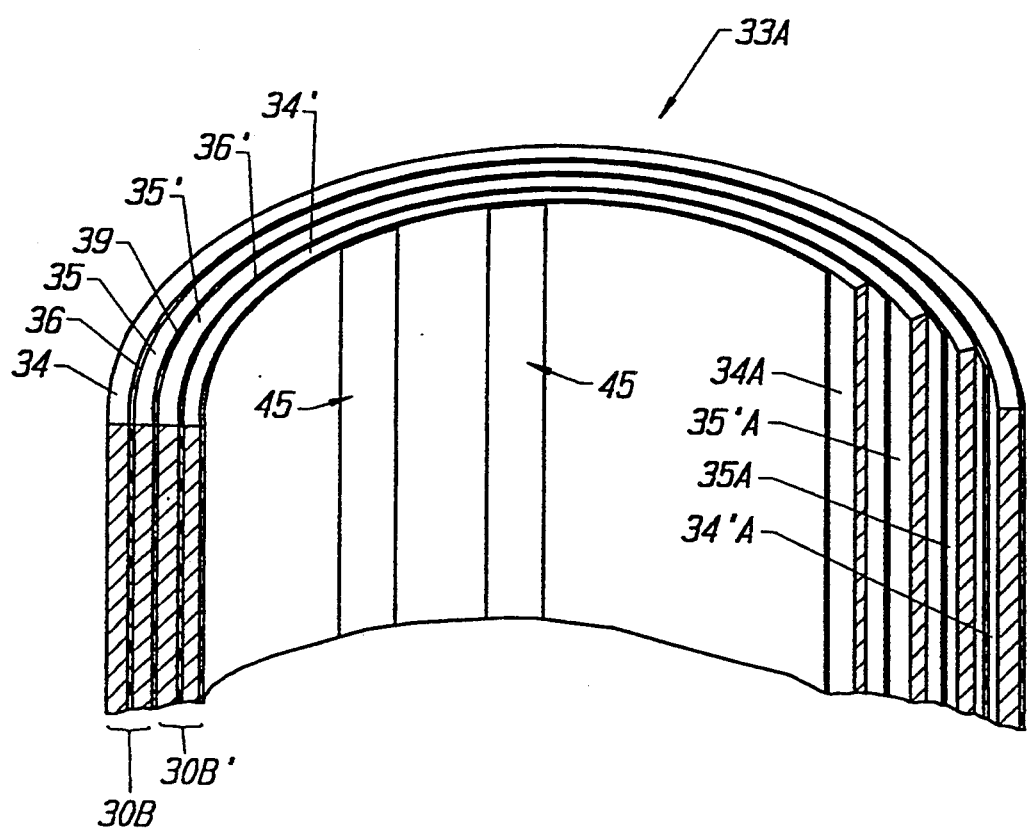
FIG. 2b shows a longitudinal sectional view of a hollow coil as a schematic partial representation.
Figure 3:
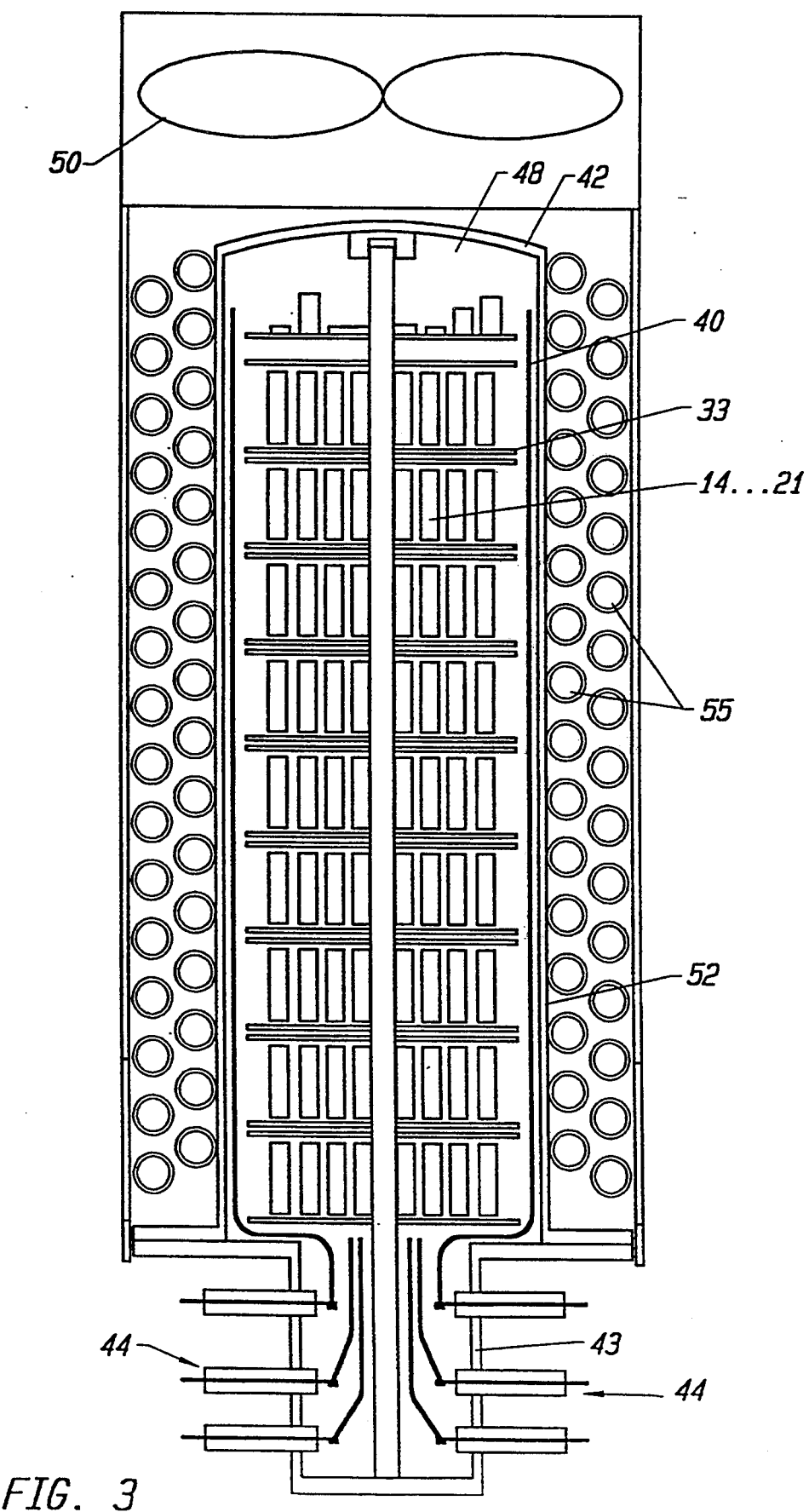
FIG. 3 shows a half-bridge arrangement with several printed circuit boards in a hollow coil as a schematic longitudinally sectioned view.

Secondly, as illustrated in FIGS. 2b and 3, capacitor assembly 30 is formed by a wrap capacitor 30b designed as a hollow coil 40. For the sake of clarity, only one layer is shown for each capacitor assembly 30b, and a total of only two layers is illustrated. Actually, however, several layers are provided for each capacitor assembly, and a separate capacitor assembly 30b is associated with each printed circuit board.

Said hollow coil 40 is of an essentially cylinder shaped design and comprises several layers of copper layers 34, 35 with one insulating layer 36 each. To improve the electric strength between the individual capacitor assemblies and for better decoupling, the individual assemblies comprising the copper layers 34, 35 and one insulating layer 36 each are sandwiched in such a manner that each of the first or second copper layer 34, 35, respectively, of an assembly is arranged adjacent to the first or second copper layer 34', 35', respectively, of another assembly 34', 35', 36'. Between the individual assemblies 34, 35, 36; 34', 35', 36' a thin insulating layer 39 is arranged. In other words, neighbouring capacitor assemblies 30b, 30b' are arranged in opposite orientation adjacent to each other.

In the interior of wrap capacitor 30b formed as a hollow coil 40 several printed circuit boards 33 with individual semiconductor assemblies are stacked one above the other.

Hollow coil 40 is sealed at one end in a fluid tight manner by means of a convex end cap 42, while it tapers bottle-shaped at the other end, so as to extend into a connection piece 43, where terminals 44 for the supply voltages, the output lines and the control lines are projecting outwardly.

In order to be able to provide for each of stacked printed circuit boards 33 a separate capacitor 30b, a separate output terminal A as well as corresponding control terminals which can be connected in a simple manner with terminals 44, the structure of hollow coil 40 has been devised such that the individual copper layers extend in an offset pattern at the inner surface of hollow coil 40 in a circumferential direction so that areas 34a, 35a, 34a', 35a' of the individual first and second copper layers 34, 35, 34', 35' as well as insulated conductor strips 45 are exposed for output terminals A.

The terminals for the high and low voltage potential, for the respective capacitor assembly or for the control terminals and output terminals, respectively, are so arranged along the circimference of circular disk-shaped printed circuit boards 33 whose outer diameter approximately corresponds to the inner diameter of hollow coil 40, that they make contact with exposed areas 34a, 35a, 34'a, 35'a of the individual first and second copper layers or insulated conductor strips 45, respectively.

The hollow coil is provided with a shroud 52 so that the entire arrangement is made resistant to pressure of up to approx. 15 bar.

The interior of the hollow coil is filled with a liquid fluorocarbon with the fluid covering the semiconductor switches. Between the fluid level and cap 42 a free space is provided so that a gaseous phase of the fluorocarbon can escape from the liquid phase. The gas pressure in hollow coil 40 is set in accordance with the gas pressure curve of the fluorocarbon between 50 mbar and 3 bar so that already at a slight temperature increase of the MOSFETS's under operating conditions, the liquid phase of the fluorocarbon begins to boil. It is thus achievable that the temperature difference between the semiconductor switches and the atmosphere surrounding the hollow coil amounts to only approx. 10° C.

Because hollow coil 40 is externally cooled by convection cooling of by only illustrated schematically—fan cooling 50, the gas phase of the fluorocarbon condensates at the externally cooled inner wall of the hollow coil and is returned in liquid state via a pumping means (not shown) to the liquid fluorocarbon surrounding the MOSFET's. This construction functions as a down cooling heat exchanger which removes dissipated heat from the interior of hollow coil 40 via convection cooling means 55 arranged a the outer surface of hollow coil 40.

In FIG. 3 the hollow coil 40 is shown vertically so that the free space above the liquid fluorocarbon is relatively small for the gas phase and the area of the inner wall where condensation can take place is also relatively small. It may therefore be more advantageous to arrange the hollow coil horizontally and also to design and mount the printed circuit boards accordingly which for certain ratios of filling height, length and diameter of hollow coil 40 results in a larger condensation area.

We claim:

1. A half-bridge arrangement for switching electrical power, wherein
   a) at least first and second semiconductor switches (14, 21; 15, 20; 16, 19; 17, 18) forming a half-bridge (12a; 12b; 12c; 12d) are connected in series;
   b) each semiconductor switch (14, 21; 15, 20; 16, 19; 17, 18) is provided with a control input (G) which is connected to a driving means (23, 24);
   c) each first semiconductor switch (14; 15; 16; 17) is at a high voltage potential ($V_{SS}$) with its source terminal (S);
   d) each second semiconductor switch (18; 19; 20; 21) is at a low voltage potential ($V_{DD}$) with its drain terminal (D);
   e) the drain terminal (D) of each first semiconductor switch (14; 15; 16; 17) is connected with the source terminal (S) of each respective second semiconductor switch (18; 19; 20; 21) for providing an output terminal (A); and
   f) at least one capacitor assembly (30) is arranged between the high and the low voltage potential ($V_{SS}$, $V_{DD}$);
   characterized in that
   g) said driving means (23, 24) activates said semiconductor switches (14, 21; 15, 20; 16, 19; 17, 18) by means of a control signal with a switching frequency of more than 20 kHz;
   h) said capacitor assembly (30) is made up by at least one sheet capacitor (30a) on a printed circuit board (33) carrying said semiconductor switches (14, 21; 15, 20; 16, 19; 17, 18) and by at least one wrap capacitor (30b) designed as a hollow coil (40);
   i) said semiconductor switches (14, 21; 15, 20; 16, 19; 17, 18) being arranged within said wrap capacitor (30b); and
   j) a fluid cooling being provided within the hollow coil (40).

2. A half-bridge arrangement in accordance with claim 1, characterized in that said hollow coil (40) is sealed in a fluid tight manner.

3. A half-bridge arrangement in accordance with claim 1, characterized in that said semiconductor switches (14, 21; 15, 20; 16, 19; 17, 18) are formed by high speed, low-loss field-effect transistors (FET's) or by high speed, low-loss bipolar transistors with insulated gate terminal (IGBT's).

4. A half-bridge arrangement in accordance with claim 3, characterized in that several pairs of said series-connected semiconductor switches (14, 21; 15, 20; 16, 19; 17, 18) are connected in parallel.

5. A half-bridge arrangement in accordance with claim 3, characterized in that said semiconductor switches (14, 21; 15, 20; 16, 19; 17, 18) are constructed of a large number of individual semiconductor switching elements each of which having a small switching capacity.

6. A half-bridge arrangement in accordance with claim 2, characterized in that each driving means (23, 24) is arranged inside said hollow coil (40).

7. A half-bridge arrangement in accordance with claim 1, further comprising the printed circuit board (33) formed as a multilayer board with at least
   a) a first conductive layer (34) carrying the high voltage potential;
   b) a second conductive layer (35) carrying the low voltage potential; and
   c) an insulating layer (36) being arranged between the first and the second conductive layer (34, 35).

8. A half-bridge arrangement in accordance with claim 2, characterized in that
   a) said hollow coil (40) is formed of several layers with at least a first conductive layer (34) carrying the high voltage potential;
   b) at least a second conductive layer (34) carrying the low voltage potential; and
   c) an insulating layer (36) being arranged between the first and the second conductive layer (34, 35).

9. A half-bridge arrangement in accordance with claim 2, characterized in that
   a) said hollow coil (40) features several assemblies comprising first and second layers (34, 35; 34', 35') as well as insulating layers (36, 36'), wherein
   b) the assemblies extend at an inner side of said hollow coil (40) in a circumferential direction in an offset manner so that areas (34a, 35a; 34'a, 35'a) of the individual first and second conductive layers (34, 35; 34', 35') as well as
   c) insulated conductor strips (45) are exposed.

10. A half-bridge arrangement in accordance with claim 9, characterized in that
    a) the assemblies comprising the first and second layers (34, 35; 34', 35') as well as the insulating layers (36, 36') are sandwiched in such a manner that each of the first or second conductive layer (35), respectively, of an assembly is arranged adjacent to the first or second conductive layer (35'), respectively, of another assembly, and
    b) a thin insulating layer (39) is arranged between the individual assemblies.

11. A half-bridge arrangement in accordance with claim 10, characterized in that
    a) said first conductive layer (34; 34') is a copper layer with a thickness of at least 70 μm;
    b) said second conductive layer (35; 35') is a copper layer with a thickness of at least 70 μm; and
    c) said insulating layer (36; 36') is a plastic layer with a thickness of at least 10–20 μm made from Kapton.

12. A half-bridge arrangement in accordance with claim 7, characterized in that
    a) several printed circuit boards (33) with half-bridges (12, 12') are arranged in an axially spaced relationship in an interior of said hollow coil (40),
    b) where terminals of each of printed circuit boards for the high and low voltage potentials or for the relevant capacitor assembly (30) or for control terminals and output terminals (A) are arranged at a circumference of each of printed circuit boards (33) in such a manner that they make contact with exposed areas (34a, 35a; 34'a, 35'a) of said first and second conductive layers (34, 35; 34', 35') or said insulated conductor strips (45).

13. A half-bridge arrangement in accordance with claim 2, characterized in that said hollow coil (40) is provided with a shroud (52) so that the entire arrangement is made resistant to pressure of up to approximately 15 bar.

14. A half-bridge arrangement in accordance with claim 13, characterized in that
  a) fluid cooling is effected as boiling bath cooling with a liquid fluorocarbon with the pressure in an interior of said hollow coil (40) ranging from 50 mbar to 3 bar, and with
  b) the temperature difference between semiconductor switches (14, 21; 15, 20; 16, 19; 17, 18) and the environment surrounding said hollow coil (40) amounting to approximately 10° C.

15. A half-bridge arrangement in accordance with claim 14, characterized in that
  a) said boiling bath cooling includes a down cooling heat exchanger which via
  b) convection cooling means (50) arranged at an outer surface of said hollow coil (40) removes dissipated heat from the interior of said hollow coil (40).

* * * * *

UNITED STATES PATENT AND TRADEMARK OFFICE
CERTIFICATE OF CORRECTION

PATENT NO. : 5,381,330

DATED : January 10, 1995

INVENTOR(S) : Andreas Grundl et al.

It is certified that error appears in the above-identified patent and that said Letters Patent is hereby correct as shown below:

IN THE ABSTRACT:

In line 12, delete (14; 5; 16; 17) and insert --(14; 15; 16; 17)--.
In line 23, delete "and" and insert --or--.

IN THE SPECIFICATION:

In column 2, line 5, delete "on the one hand leads to a reduction of life and on the other hand to the impossibility of any application under ex conditions" and insert --have the disadvantage of a reduced useful life--.
In column 3, line 65, delete "35 μm 70 μm;" and insert -- 35 μm - 70 μm;--

IN THE CLAIMS

The following claims were deleted from the printed patent:
In Column 10, line 11, insert --
16. A half-bridge arrangement for switching electrical power, wherein
 a) at least first and second semiconductor switches (14, 21; 15, 20; 16, 19; 17, 18) forming a half-bridge (12a; 12b; 12c; 12d) are connected in series;
 b) each semiconductor switch (14, 21; 15, 20; 16, 19; 17, 18) is provided with a control input (G) which is connected to a driving means (23, 24);

UNITED STATES PATENT AND TRADEMARK OFFICE
CERTIFICATE OF CORRECTION

PATENT NO.  : 5,381,330

DATED       : January 10, 1995

INVENTOR(S) : Andreas Grundl et al.

It is certified that error appears in the above-identified patent and that said Letters Patent is hereby correct as shown below:

c)     each first semiconductor switch (14; 15; 16; 17) is at a high voltage potential ($V_{SS}$) with its source terminal (S);

d)     each second semiconductor switch (18; 19; 20; 21) is at a low voltage potential ($V_{DD}$) with its drain terminal (D);

e)     the drain terminal (D) of each first semiconductor switch (14; 15; 16; 17) is connected with the source terminal (S) of each respective second semiconductor switch (18; 19; 20; 21) for providing an output terminal (A); and f)     at least one capacitor assembly (30) is arranged between the high and the low voltage potentials ($V_{SS}$, $V_{DD}$);
characterized in that g)     said driving means (23, 24) activates said semiconductor switches (14, 21; 15, 20; 16, 19; 17, 18) by means of a control signal with a switching frequency of more than 20 kHz; and h)     said capacitor assembly (30) is made up by at least one sheet capacitor (30a) on a printed circuit board (33) carrying said semiconductor switches (14, 21; 15, 20; 16, 19; 17, 18).

17. A half-bridge arrangement in accordance with Claim 16, characterized in that said semiconductor switches (14, 21; 15, 20; 16, 19; 17, 18) are formed by high speed, low-loss field-effect transistors (FET's) or by high speed, low-loss bipolar transistors with insulated gate terminal (IGBT's).

UNITED STATES PATENT AND TRADEMARK OFFICE
CERTIFICATE OF CORRECTION

PATENT NO. : 5,381,330

DATED : January 10, 1995

INVENTOR(S) : Andreas Grundl *et al.*

It is certified that error appears in the above-identified patent and that said Letters Patent is hereby correct as shown below:

18. A half-bridge arrangement in accordance with Claim 17, characterized in that several pairs of said series-connected semiconductor switches (14, 21; 15, 20; 16, 19; 17, 18) are connected in parallel.

19. A half-bridge arrangement in accordance with Claim 17, characterized in that said semiconductor switches (14, 21; 15, 20; 16, 19; 17, 18) are constructed of a large number of individual semiconductor switching elements each of which having a small switching capacity.

20. A half-bridge arrangement in accordance with Claim 16, further comprising the printed circuit board (33) formed as a multilayer board with at least
    a)      a first conductive layer (34) carrying the high voltage potential;
    b)      a second conductive layer (35) carrying the low voltage potential; and
    c)      an insulating layer (36) being arranged between the first and the second conductive layer (34, 35).

21. A half-bridge arrangement for switching electrical power, wherein
    a)      at least first and second semiconductor switches (14, 21; 15, 20; 16, 19; 17, 18) forming a half-bridge (12a; 12b; 12c; 12d) are connected in series;
    b)      each semiconductor switch (14, 21; 15, 20; 16, 19; 17, 18) is provided with a control input (G) which is connected to a driving means (23, 24);
    c)      each first semiconductor switch (14; 15; 16; 17) is at a high voltage potential ($V_{SS}$) with its source terminal (S);
    d)      each second semiconductor switch (18; 19; 20; 21) is at a low voltage potential ($V_{DD}$) with its drain terminal (D);
    e)      the drain terminal (D) of each first semiconductor switch (14; 15; 16; 17) is connected with the source terminal (S) of each respective second semiconductor switch (18; 19; 20; 21) for providing an output

UNITED STATES PATENT AND TRADEMARK OFFICE
CERTIFICATE OF CORRECTION

PATENT NO. : 5,381,330

DATED : January 10, 1995

INVENTOR(S) : Andreas Grundl et al.

It is certified that error appears in the above-identified patent and that said Letters Patent is hereby correct as shown below:

terminal (A); and f)  at least one capacitor assembly (30) is arranged between the high and the low voltage potentials ($V_{SS}$, $V_{DD}$);
characterized in that g)  said driving means (23, 24) activates said semiconductor switches (14, 21; 15, 20; 16, 19; 17, 18) by means of a control signal with a switching frequency of more than 20 kHz;

h)  said capacitor assembly (30) is made up by at least one wrap capacitor (30b) designed as a hollow coil (40);

i)  said semiconductor switches (14, 21; 15, 20; 16, 19; 17, 18) being arranged within said wrap capacitor (30b); and j)  a fluid cooling being provided within the hollow coil (40).

22.  A half-bridge arrangement in accordance with Claim 21, characterized in that said hollow coil (40) is sealed in a fluid tight manner.

23.  A half-bridge arrangement in accordance with Claim 21, characterized in that said semiconductor switches (14, 21; 15, 20; 16, 19; 17, 18) are formed by high speed, low-loss field-effect transistors (FET's) or by high speed, low-loss bipolar transistors with insulated gate terminal (IGBT's).

24.  A half-bridge arrangement in accordance with Claim 23, characterized in that several pairs of said series-connected semiconductor switches (14, 21; 15, 20; 16, 19; 17, 18) are connected in parallel.

UNITED STATES PATENT AND TRADEMARK OFFICE
CERTIFICATE OF CORRECTION

PATENT NO. : 5,381,330

DATED : January 10, 1995

INVENTOR(S) : Andreas Grundl et al.

It is certified that error appears in the above-identified patent and that said Letters Patent is hereby correct as shown below:

25. A half-bridge arrangement in accordance with Claim 23, characterized in that said semiconductor switches (14, 21; 15, 20; 16, 19; 17, 18) are constructed of a large number of individual semiconductor switching elements each of which having a small switching capacity.

26. A half-bridge arrangement in accordance with Claim 22, characterized in that each driving means (23, 24) is arranged inside said hollow coil (40).

27. A half-bridge arrangement in accordance with Claim 21, further comprising the printed circuit board (33) formed as a multilayer board with at least
    a)      a first conductive layer (34) carrying the high voltage potential;
    b)      a second conductive layer (35) carrying the low voltage potential; and
    c)      an insulating layer (36) being arranged between the first and the second conductive layers (34, 35).

28. A half-bridge arrangement in accordance with Claim 22, characterized in that
    a)      said hollow coil (40) is formed of several layers with at least a first conductive layer (34) carrying the high voltage potential;
    b)      at least a second conductive layer (34) carrying the low voltage potential; and
    c)      an insulating layer (36) being arranged between the first and the second conductive layers (34, 35).

UNITED STATES PATENT AND TRADEMARK OFFICE
CERTIFICATE OF CORRECTION

PATENT NO. : 5,381,330

DATED : January 10, 1995

INVENTOR(S) : Andreas Grundl et al.

It is certified that error appears in the above-identified patent and that said Letters Patent is hereby correct as shown below:

29. A half-bridge arrangement in accordance with Claim 22, characterized in that
   a) said hollow coil (40) features several assemblies comprising first and second layers (34, 35; 34', 35') as well as insulating layers (36, 36'), wherein
   b) the assemblies extend at an inner side of said hollow coil (40) in a circumferential direction in an offset manner so that areas (34a, 35a; 34'a, 35'a) of the individual first and second conductive layers (34, 35; 34', 35') as well as
   c) insulated conductor strips (45) are exposed.

30. A half-bridge arrangement in accordance with Claim 29, characterized in that
   a) the assemblies comprising the first and second layers (34, 35; 34', 35') as well as the insulating layers (36, 36') are sandwiched in such a manner that each of the first or second conductive layer (35), respectively, of an assembly is arranged adjacent to the first or second conductive layer (35'), respectively, of another assembly, and
   b) a thin insulating layer (39) is arranged between the individual assemblies.

31. A half-bridge arrangement in accordance with Claim 30, characterized in that
   a) said first conductive layer (34; 34') is a copper layer with a thickness of at least 70 μm;
   b) said second conductive layer (35; 35') is a copper layer with a thickness of at least 70 μm; and
   c) said insulating layer (36; 36') is a plastic layer with a thickness of at least 10 - 20 μm made from Kapton.

UNITED STATES PATENT AND TRADEMARK OFFICE
CERTIFICATE OF CORRECTION

PATENT NO. : 5,381,330

DATED : January 10, 1995

INVENTOR(S) : Andreas Grundl *et al.*

It is certified that error appears in the above-identified patent and that said Letters Patent is hereby correct as shown below:

32. A half-bridge arrangement in accordance with Claim 27, characterized in that
    a) several printed circuit boards (33) with half-bridges (12, 12') are arranged in an axially spaced relationship in an interior of said hollow coil (40),
    b) where terminals of each of printed circuit boards for the high and low voltage potentials or for the relevant capacitor assembly (30) or for control terminals and output terminals (A) are arranged at a circumference of the each of printed circuit boards (33) in such a manner that they make contact with exposed areas (34a, 35a; 34'a, 35'a) of said first and second conductive layers (34, 35; 34', 35') or said insulated conductor strips (45).

33. A half-bridge arrangement in accordance with Claim 22, characterized in that said hollow coil (40) is provided with a shroud (52) so that the entire arrangement is made resistant to pressure of up to approximately 15 bar.

34. A half-bridge arrangement in accordance with Claim 33, characterized in that
    a) fluid cooling is effected as boiling bath cooling with a liquid fluorocarbon with the pressure in an interior of said hollow coil (40) ranging from 50 mbar to 3 bar, and with
    b) a temperature difference between semiconductor switches (14, 21; 15, 20; 16, 19; 17, 18) and an environment surrounding said hollow coil (40) amounting to approximately 10°C.

UNITED STATES PATENT AND TRADEMARK OFFICE
CERTIFICATE OF CORRECTION

PATENT NO. : 5,381,330

DATED : January 10, 1995

INVENTOR(S) : Andreas Grundl et al.

It is certified that error appears in the above-identified patent and that said Letters Patent is hereby correct as shown below:

35. A half-bridge arrangement in accordance with Claim 34, characterized in that
    a) said boiling bath cooling includes a down cooling heat exchanger which via
    b) convection cooling means (50) arranged at an outer surface of said hollow coil (40) removes dissipated heat from the interior of said hollow coil (40).--

Signed and Sealed this

Seventh Day of October, 1997

*Attest:*

BRUCE LEHMAN

*Attesting Officer*      Commissioner of Patents and Trademarks